(12) United States Patent
Vainas et al.

(10) Patent No.: US 10,394,954 B2
(45) Date of Patent: Aug. 27, 2019

(54) NATURAL LANGUAGE INTENT AND LOCATION DETERMINATION METHOD AND APPARATUS

(71) Applicant: Intel Corporation, Santa Clara, CA (US)

(72) Inventors: Oded Vainas, Petah Tiqwa (IL); Oren Pereg, Amikam (IL); Omri Mendels, Tel Aviv (IL); Ronen Soffer, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 15/443,043

(22) Filed: Feb. 27, 2017

(65) Prior Publication Data

US 2018/0246877 A1   Aug. 30, 2018

(51) Int. Cl.
*G06F 17/20*      (2006.01)
*G06F 17/27*      (2006.01)

(52) U.S. Cl.
CPC ........ *G06F 17/278* (2013.01); *G06F 17/2785* (2013.01)

(58) Field of Classification Search
USPC ............................................... 704/7–10, 275
See application file for complete search history.

(56) References Cited

U.S. PATENT DOCUMENTS

| | | | |
|---|---|---|---|
| 9,015,099 B2 | 4/2015 | Nitz et al. | |
| 9,117,447 B2 | 8/2015 | Gruber et al. | |
| 9,690,776 B2 * | 6/2017 | Sarikaya | G06F 17/2785 |
| 2003/0105589 A1 * | 6/2003 | Liu | G06F 17/30017 702/1 |
| 2004/0215663 A1 * | 10/2004 | Liu | G06F 17/30017 |
| 2012/0084248 A1 | 4/2012 | Gavrilescu | |
| 2014/0222433 A1 * | 8/2014 | Govrin | G06Q 40/02 704/260 |
| 2017/0024375 A1 * | 1/2017 | Hakkani-Tur | G06F 17/2785 |
| 2017/0069310 A1 * | 3/2017 | Hakkani-Tur | G10L 15/063 |
| 2018/0157638 A1 * | 6/2018 | Li | G06F 17/279 |
| 2018/0157958 A1 * | 6/2018 | Fourney | G06N 3/006 |

OTHER PUBLICATIONS

Falchuk, B., Loeb, S., & Panagos, E. (2009). Actionable User Intentions for Real-Time Mobile Assistant Applications. PMPC@UMAP.
Tomas Mikolov, Ilya Sutskever, Kai Chen, Greg Corrado, and Jeffrey Dean (2013) Distributed representations of words and phrases and their compositionality. In Proceedings of the 26th International Conference on Neural Information Processing Systems (NIPS'13), «https://papers.nips.cc/paper/5021-distributed-representations-of-words-and-phrases-and-their-compositionality.pdf».

* cited by examiner

*Primary Examiner* — Leonard Saint Cyr
(74) *Attorney, Agent, or Firm* — Schwabe, Williamson & Wyatt, P.C.

(57) ABSTRACT

Methods, apparatus, and system to parse an unstructured, natural language input of a user, infer a semantic meaning of an intent of the user, and determine a present or future user state, including a location and a time, in which the intent can be fulfilled.

25 Claims, 7 Drawing Sheets

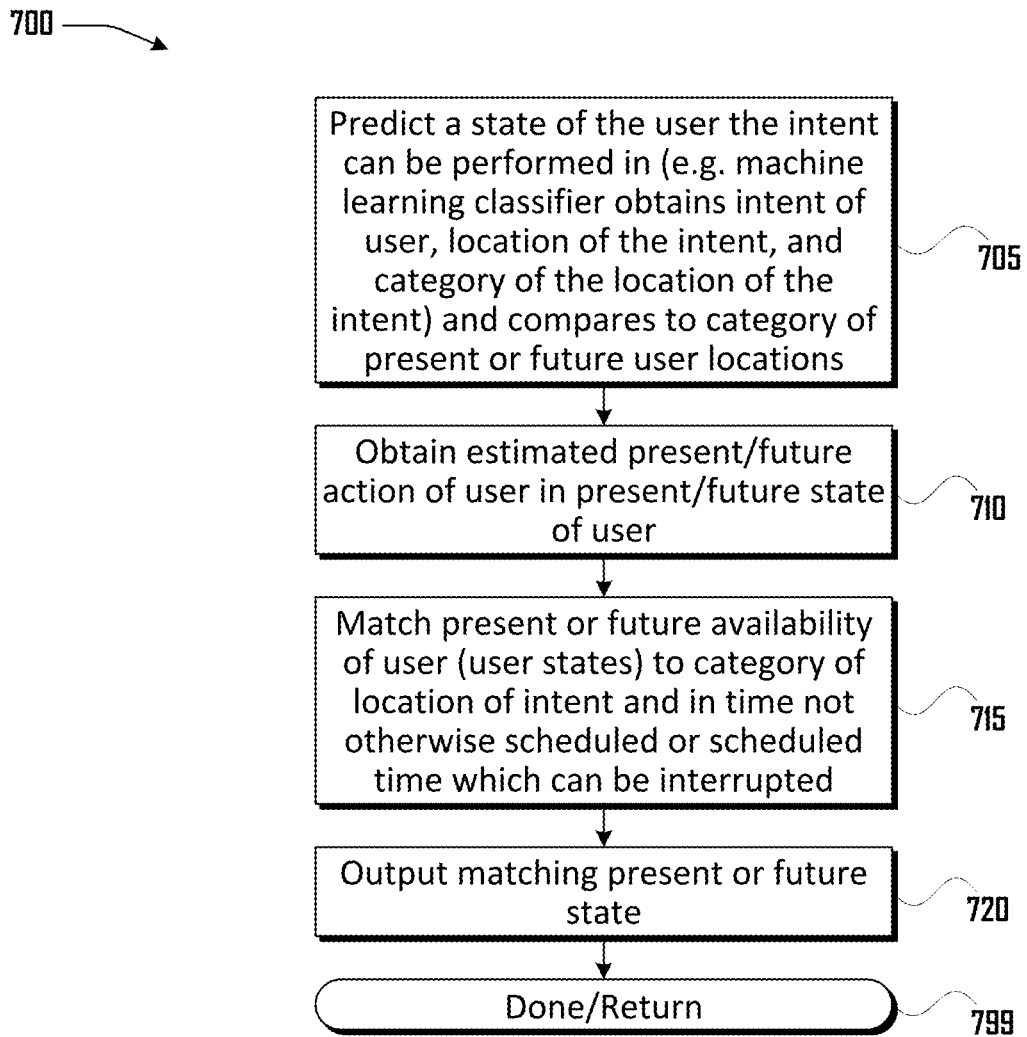

NATURAL LANGUAGE INTENT AND LOCATION DETERMINATION METHOD AND APPARATUS

FIELD

The present disclosure relates to the fields of computing, artificial intelligence, and machine learning, in particular to, determination of intent and a location to fulfill the intent from a natural language input.

BACKGROUND

In many personal assistant applications, such as CORTANA™, Google Now, SIRI®, and many reminder based applications, such as GOOGLE KEEP® or ANY.DO™, users can add triggers to be reminded about their intents when they arrive to a particular location or at a specific time, where time can be also a semantic time, such as "evening" or "on the bus". Such reminders will trigger when the user is close to or at the specific location or when the specified time comes. The content of the reminders reflect the intention of the user at that location/time (e.g. "wash the dishes when I arrive home", "buy milk at the supermarket").

Such digital assistant and reminder applications do not receive unstructured natural language input and infer from it the location at which the user can fulfil an intent; users must specify where and/or when they want the system to fulfil the intent.

BRIEF DESCRIPTION OF THE DRAWINGS

FIG. 7 is a flow diagram illustrating an example of a method performed an intent-to-state matching module, according to some embodiments.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, the term "module" (or "logic") may refer to, be part of, or include an Application Specific Integrated Circuit ("ASIC"), a System on a Chip ("SoC"), an electronic circuit, a programmed programmable circuit (such as, Field Programmable Gate Array ("FPGA")), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the Figures.

As used herein, a process corresponds to an instance of a program, e.g., an application program, executing on a processor and a thread corresponds to a portion of the process. A processor may include one or more execution core(s). The processor may be coupled to one or more socket(s).

In overview, this disclosure relates to methods and systems in a computer device, apparatus, or system (with hardware accelerators) to parse an unstructured, natural language input of a user, infer a semantic meaning of an intent of the user, and determine a present or future user state, including a location and a time, in which the intent can be fulfilled. By way of example, a user may state, "wash dishes", without specifying where or when to perform this intent. The system parses the natural language input, determines that it is the speaker who is to perform the intent, "wash dishes", and that the intent can be and is typically performed by the user and/or others at a location categorized as "home". The system can then create and activate a reminder to remind the user to wash dishes the next time the user is at home. The system can confirm the inferred location and time of the reminder.

The disclosed method and system facilitates human user interaction with personal assistant applications.

Figure 1:
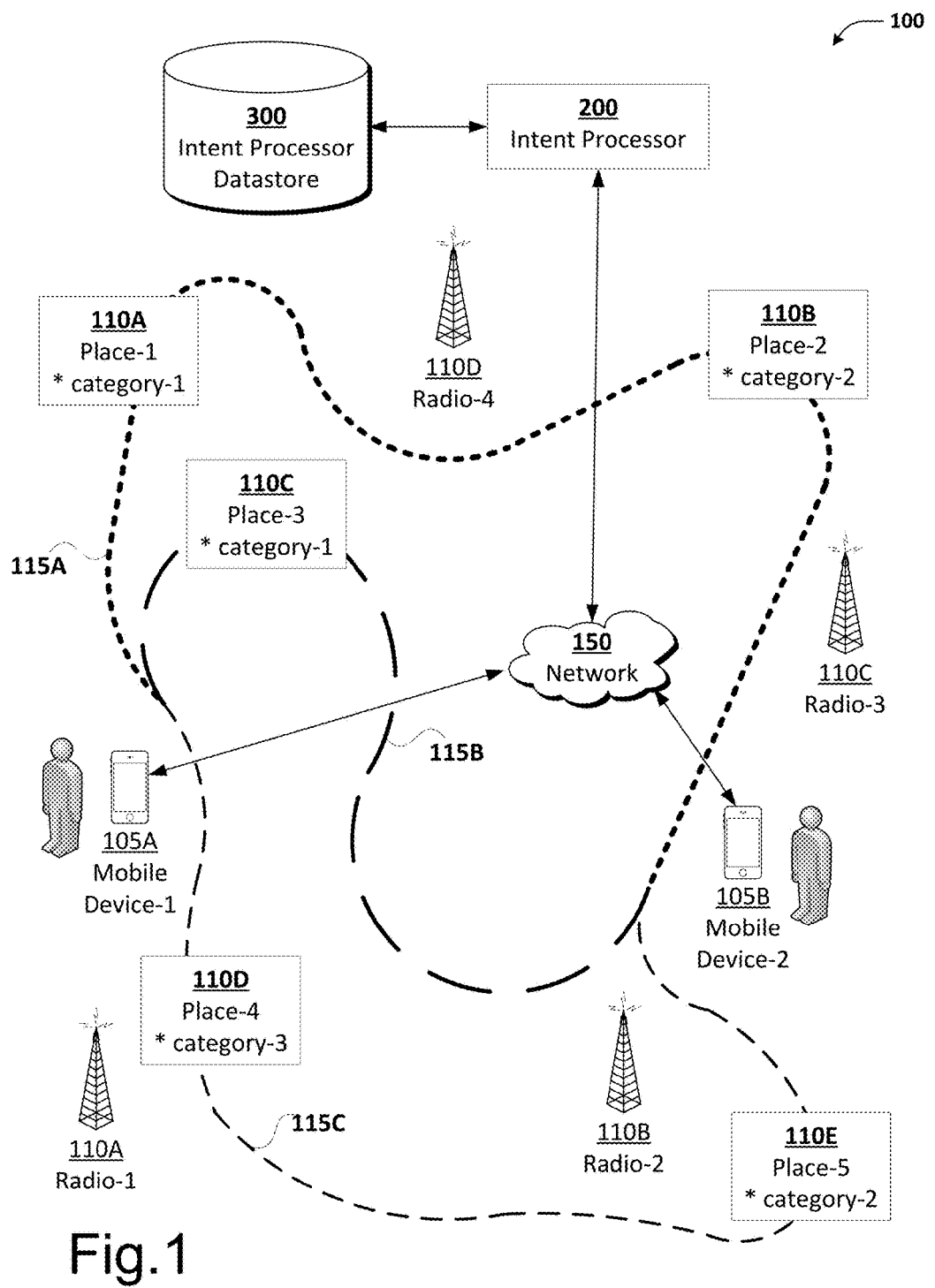
FIG. 1 is a network and device diagram illustrating an example of at least one computer device in a network environment incorporated with teachings of the present disclosure, according to some embodiments.

FIG. 1 is a network and device diagram illustrating an example of intent processor 200 and intent processor datastore 300, mobile device-1 105A, mobile device-2 105, radio-1 110A, radio-2 110B, radio-3 110C, and radio-4 110D, route-A 115A, route-B 115B, and route-C 115C, place-1 110A, place-2 110B, place-3 110C, place-4 110D, and place-5 110E, and network 150, incorporated with the teachings of the present disclosure, according to some embodiments. In embodiments, intent processor 200 may include an interface 400 (FIGS. 2 and 4), an intent extraction module 500 (FIGS. 2 and 5), a state of user module 600 (FIGS. 2 and 6), and an intent-to-state matching module 700 (FIGS. 2 and 7) (to be described more fully below).

Intent processor 200, except for the teachings of the present disclosure, may include and/or be provided by, but is not limited to, a cluster of computing nodes, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.), a virtual reality display or supporting computers therefore, and the like. In embodiments, each computing node, a server, a workstation computer et al may include one or more hardware accelerators implementing one or more modules 400-700.

Also illustrated in FIG. 1 is intent processor datastore 300. Intent processor datastore 300 is described further, herein, though, generally, it should be understood as a datastore used by intent processor 200. While for ease of understanding, one block is used to represent intent datastore 300, in embodiments, datastore 300 may be implemented on a cluster of local or distributed storage devices.

Also illustrated in FIG. 1 are mobile device-1 105A and mobile device-2 105B. These should be understood as mobile computers, such as mobile telephones, laptop computers, tablet computers, and the like. These should be understood as potentially comprising sensors, such as inertial measurement sensors and the like, compasses, global position system ("GPS") modules, cellular and WiFi communication modules, and the like. These may also be referred to herein as "mobile device", "mobile computer", "mobile computing device" and the like.

Also illustrated in FIG. 1 are radio-1 110A, radio-2 110B, radio-3 110C, and radio-4 110D. These should be understood as one- or two-way radios, such as cellular telephone base station sites, WiFi base stations, television and radio station transmitters, satellite radio transceivers (in space), wireless location determining systems (which may use a portion of the electromagnetic spectrum other than radio spectrum), and the like. These may be used as part of a location determining service, also referred to herein as a "location service". Location determining services may multi-laterate the position of a mobile target, based on signals emitted or received by the target and by, for example, a known fixed or relative position of the source or receiver of the radio signal. The target may be, for example, a mobile computer such as mobile device-1 105A and/or mobile device-2 105B.

Also illustrated in FIG. 1 are route-A 115A, route-B 115B, and route-C 115C, also referred to herein as a "route" or "routes". As discussed herein, route-A 115A may be a route repeatedly traversed by mobile device-1 105A and mobile device-2 105B; route-B 105B may be a route repeatedly traversed by mobile device-2 105B; and route-C 105C may be a route repeatedly traversed by mobile device-1 105A.

Also illustrated in FIG. 1 are place-1 110A, place-2 110B, place-3 110C, place-4 110D, and place-5 110E, generically referred to as "places". Places may be buildings or locations. Buildings may include homes, offices, retail establishments, restaurants, service providing establishments. Within the blocks for place-1 110A, place-2 110B, place-3 110C, place-4 110D, and place-5 110E are indicators of a category associated with the corresponding place, such as "category-1", "category-2", and "category-3". Association of one or more categories to a place is discussed herein.

Also illustrated in FIG. 1 is network 150. Network 150 may comprise computers, switches, routers, gateways, network connections among the computers, and software routines to enable communication between the computers over the network connections. Examples of Network 150 comprise wired networks, such as an Ethernet networks, and/or a wireless networks, such as a WiFi, GSM, TDMA, CDMA, EDGE, HSPA, LTE or other network provided by a wireless service provider; local and/or wide area; private and/or public, such as the Internet. More than one network may be involved in a communication session between the illustrated devices. Connection to Network 150 may require that the computers execute software routines which enable, for example, the seven layers of the OSI model of computer networking or equivalent in a wireless phone network.

Intent processor 200 is illustrated as separate from, for example, mobile device-1 105A and mobile device-2 105B.

Intent processor 200 may be a server which provides services to a mobile computer device, such as mobile device-1 105A, and/or intent processor 200 may incorporated into a mobile computer device.

In overview, intent processor 200 executes, operates or performs interface 400, intent extraction module 500, state of user module 600, and intent-to-state matching module 700. User interface receives unstructured, natural language input, such as speech or text input and processes the natural language input to convert it into text (if it is not already in that form). Intent processor performs intent extraction module 500 to infer semantic meaning from the natural language input. The inferred semantic meaning may include, for example, parts of speech organized as a verbal predicate, also referred to herein as an intent, an object of the intent, and a semantic representation. State of user module 600 estimates a present and/or future state of the user. The present or future state of the user may include, for example, a present and/or future location, a category associated with the present and/or future location, and a present and/or future action of the user in the present and/or future location. Intent-to-state matching module 700 may infer a category of the intent of the user, predict a state of the user the intent can be performed in, estimate a present or future action of the user, and match a present or future availability of the user to the intent based, for example, on the category of the intent. A resulting present or future state of the user and location thereof, which matches the category of the intent and in which the user is available, may be output, for example, as a reminder. The interface 400 may seek confirmation thereof and receive updates thereto.

Figure 2:
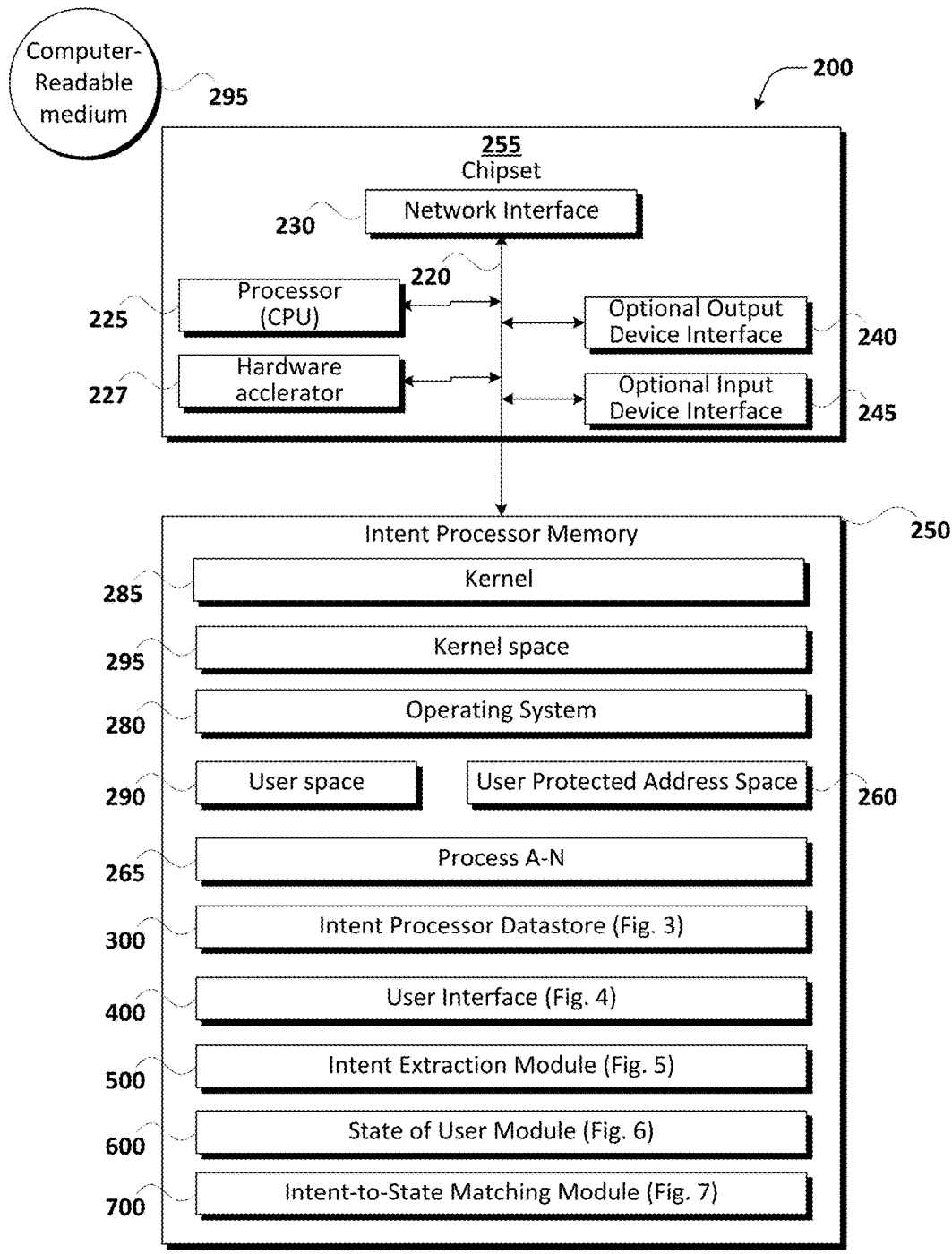
FIG. 2 is a block diagram illustrating an example of a computer device incorporated with teachings of the present disclosure, according to some embodiments.

FIG. 2 is a block diagram illustrating an example of intent processor 200 incorporated with the teachings of the present disclosure, according to some embodiments. Intent processor 200 may include chipset 255, comprising computer processor 225 and hardware accelerator 227, input/output (I/O) port(s) and peripheral device interfaces, such as output interface 240 and input interface 245, and network interface 230, and computer device memory 250, all interconnected via bus 220. Network Interface 230 may be utilized to couple computer processor 225 to a network interface card (NIC) to form connections with network 150, with intent processor datastore 300, or to form device-to-device connections with other computers. Network interface 230 may be used, for example, in a distributed embodiment of the disclosure herein, such as when interface 400 or another component is present on a mobile device and other components, such as intent extraction module 500, state of user module 600, and/or intent-to-state matching module 700 are present on a server which may be remote relative to the mobile device.

Chipset 255 may include communication components and/or paths, e.g., buses 220, that couple computer processor 225 to peripheral devices, such as, for example, output interface 240 and input interface 245, which may be connected via I/O ports. For example, chipset 255 may include a peripheral controller hub (PCH) (not shown). In another example, chipset 255 may include a sensors hub. Input interface 245 and output interface 240 may couple computer processor 225 to input and/or output devices that include, for example, user and machine interface device(s) including a display, a touch-screen display, printer, keypad, keyboard, etc., sensor(s) including an inertial measurement unit, camera, global positioning system (GPS), etc., storage device(s) including hard disk drives, solid-state drives, removable storage media, etc. I/O ports for input interface 245 and output interface 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Computer processor 225 may include one or more execution core(s), which may be central processing units ("CPUs") and/or graphics processing units ("GPUs") one or more registers, and one or more cache memor(ies). Computer processor 225 may include a memory management unit (MMU) to manage memory accesses between processor 225 and computer device memory 250. In some embodiments, computer processor 225 may be configured as one or more socket(s); each socket may include one or more core(s), a plurality of registers and one or more cache memor(ies). Each core may be configured to execute one or more process(es) 265 and/or one or more thread(s). A plurality of registers may include a plurality of general purpose registers, a status register and an instruction pointer. Cache(s) may include one or more cache memories, which may be used to cache interface 400, intent extraction module 500, state of user module 600, and intent-to-state matching module 700 of the present disclosure.

Computer processor 225 and/or chipset 225 may comprise hardware accelerator 227. Hardware accelerator 227 may comprise one or more FPGA. FPGA are also referred to herein as "natural language processing hardware accelerator" or "hardware accelerator". FPGA may be programmed/configured with a bit stream to provide logic to accelerate searches, to encode an ontology or hierarchical arrangement in a processing structure, to locate or place a term in an ontology, and/or to determine distance between a term and a glossary, such as a glossary associated with a sense of the term, a synonym set associated with the sense, a hypernym set associated with the sense, and the like.

Computer device memory 250 may generally comprise a random access memory ("RAM"), a read only memory ("ROM"), and a permanent mass storage device, such as a disk drive or SDRAM (synchronous dynamic random-access memory). Computer device memory 250 may store program code for software modules or routines, such as, for example, interface 400, intent extraction module 500, state of user module 600, and intent-to-state matching module 700. As described earlier, in some embodiments, one or more modules 400-700 may be implemented in hardware, e.g., via hardware accelerator 227.

Computer device memory 250 may also store operating system 280. These software components may be loaded from a non-transient computer readable storage medium 295 into computer device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
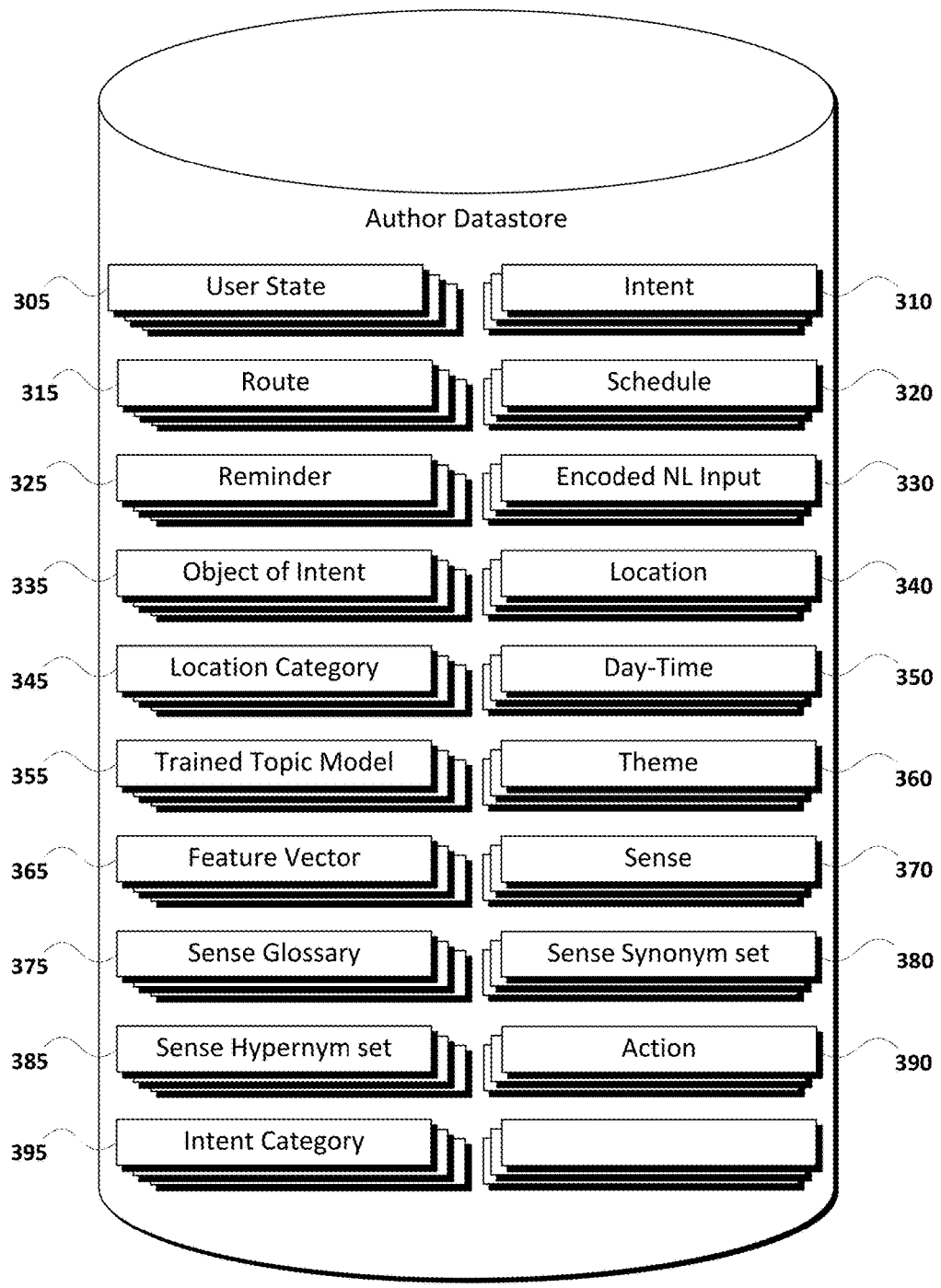
FIG. 3 is a block diagram illustrating an example of a computer device datastore for practicing the present disclosure, consistent with embodiments of the present disclosure.

Computer device memory 250 is also illustrated as comprising kernel 285, kernel space 295, user space 290, user protected address space 260, and intent processor datastore 300 (illustrated and discussed further in relation to FIG. 3).

Computer device memory 250 may store one or more process 265 (i.e., executing software application(s)). Process 265 may be stored in user space 290. Process 265 may include one or more other process 265a . . . 265n. One or more process 265 may execute generally in parallel, i.e., as a plurality of processes and/or a plurality of threads.

Computer device memory 250 is further illustrated as storing operating system 280 and/or kernel 285. The operating system 280 and/or kernel 285 may be stored in kernel space 295. In some embodiments, operating system 280 may include kernel 285. One or more process 265 may be unable to directly access kernel space 295. In other words, operating system 280 and/or kernel 285 may attempt to protect kernel space 295 and prevent access by one or more process 265a . . . 265n.

Kernel 285 may be configured to provide an interface between user processes and circuitry associated with intent processor 200. In other words, kernel 285 may be configured to manage access to computer processor 225, chipset 255, I/O ports and peripheral devices by process 265. Kernel 285 may include one or more drivers configured to manage and/or communicate with elements of intent processor 200 (i.e., computer processor 225, chipset 255, I/O ports and peripheral devices).

Intent processor 200 may also comprise or communicate via bus 220 and/or network interface 230 with intent processor datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology. Intent processor 200 may, in some embodiments, include many more components than as illustrated. However, it is not necessary that all components be shown in order to disclose an illustrative embodiment.

FIG. 3 is a block diagram of the intent processor datastore 300 illustrated in the computer device of FIG. 2, according to some embodiments. Intent processor datastore 300 may comprise multiple datastores, in and/or remote with respect to intent processor 200. Datastore 300 may be distributed. The components of intent processor datastore 300 may include data groups used by modules and/or routines, e.g., user state 305, intent 310, route 315, schedule 320, reminder 325, natural language input 330, object of intent 335, location 340, location category 345, day-time 350, trained topic model 355, theme 360, feature vector 365, sense 370, sense glossary 375, sense synonym set 380, sense hypernym set 385, action 390, and intent category 395 (to be described more fully below). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of support computer datastore 300 are discussed further herein in the discussion of other of the Figures. In overview, a user state 305 record may encode, for example, a location and an action of a user in the location. In overview, an intent 310 record may encode, for example, a verbal predicate or an intention to perform an action. In overview, a route 315 record may encode, for example, a route of a user comprising a set of locations and/or places, wherein one or more of the locations and/or placed may be visited more than once, over time, by the user. In overview, a schedule 320 comprises a schedule or reminders or events comprising at least one of an intent, day-time, location or place, object of intent, and a location category. In overview, a reminder 325 record may encode, for example, a reminder or event in schedule 320. In overview, an encoded NL input 330 record records a natural language input encoded in a binary format to be processed by a computer, such as, for example, binary encoded text. In overview, an object of intent 335 record may encode, for example, one or more people to perform an intent or one or more objects with respect to which an intent is to be performed. In overview, a location 340 record may encode, for example, a location; one or more location 340 records may be associated with a location category 345 record. In overview, a location category 345 record may encode, for example, a category of a location, including of one or more location 340 records; for example, a location 340 record may be associated with a location category 345 record for "home" or "work". A location category may also be referred to herein as a "place". In overview, a day-time 350 record may encode, for example, a time, day, or day-time, such as with respect to a schedule 320 or reminder 325 record, an action 390 record, a location 340 record, or the like. In overview, a trained topic model 355 may be a statistical model of "topics" that occur in a collection; the collection may be collected in relation to a location and/or an action. In overview, a theme 360 record may encode, for example, an object, such as an object of intent, and a semantic representation. In overview, a feature vector 365 record may encode, for example, an n-dimensional vector of numerical features that represent an object. In overview, a sense 370 record may encode, for example, a word sense, meaning, or definition. In overview, a sense glossary 375 record may encode, for example, one or more glossary entries associated with a sense. In overview, a sense synonym set 380 record may encode, for example, one or more synonyms for a sense. In overview, a sense hypernym set 385 record may encode, for example, one or more hypernyms for a sense as well as hyponyms within a hypernym. In overview, an action 390 record may encode, for example, an action of a person or object; actions may also be understood as verbs. In overview, an intent category 395 may encode, for example, a category associated with an intent.

Figure 4:
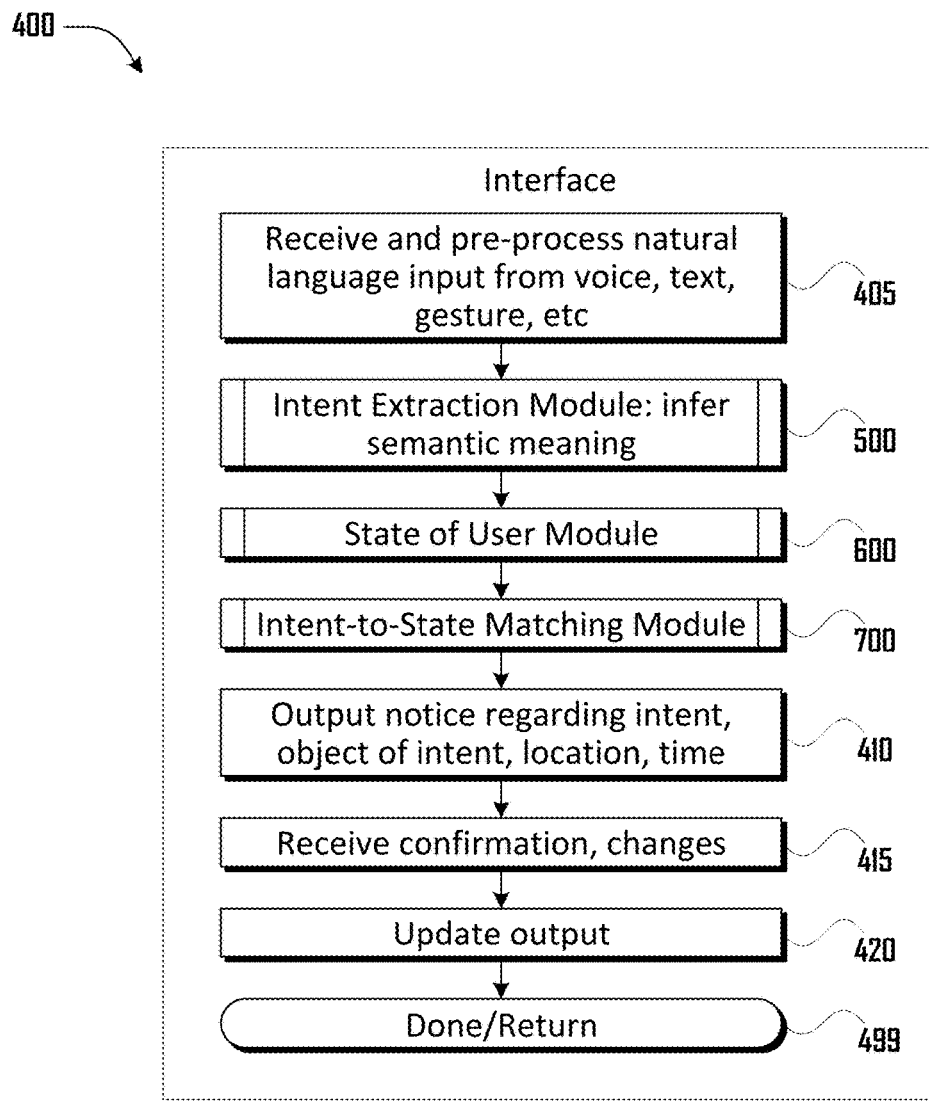
FIG. 4 is a flow diagram illustrating an example of a method performed by user interface, according to some embodiments.

FIG. 4 is a flow diagram illustrating an example of a method performed by interface 400, according to some embodiments. All or part of interface 400 may be performed by, for example, intent processor 200 and/or a mobile device, such as mobile device-1 105A and/or mobile device-2 105B. Interface 400 may be performed with respect to a user, such as a user of a mobile computer device.

At block 405, interface 400 may receive and pre-process natural language input. Natural language input may be received in the form of, for example, text, voice (including phonemes), gestures, images, and the like. Pre-processing may be performed on the input to convert it into text and/or another encoded binary form. For example, speech-to-text pre-processing may be performed on speech input; image-to-text pre-processing may be performed on image (including video) input; analog-to-digital conversion, in general, may be performed to convert analog communications into an encoded digital form. The pre-processed natural language input may be stored as, for example, one or more encoded NL input 330 records. The natural language input may be unstructured and/or may lack a statement of a location and/or a time. For example, the natural language input may be an utterance such as, "wash dishes" and encoded NL input 330 records may record the text "wash dishes".

At block 500, interface 400 may invoke extraction module 500 to infer a semantic meaning of the encoded NL input 330 records of block 405. This is discussed at great length in relation to FIG. 5 and intent extraction module 500. In overview, the inferred semantic meaning may include, for example, parts of speech organized as a verbal predicate, also referred to herein as an intent, an object of the intent, and a semantic representation. For example, a verbal predicate of "wash dishes" may be "wash", as in, to clean, while an object of the intent may be "me" (the speaker) and/or "dishes". Block 500 may be performed remotely and/or locally relative to a device performing other components of interface 400.

At block 600, interface 400 may invoke state of user module 600 determine a present or future state of a user. The present or future state of the user may comprise, for example, a location of the user, a category of the location of the user, an action of the user, and/or an availability of the user (whether in the present or future). State of user module 600 may determine the present or future state of the user as described in (described further in relation to FIG. 6). The present or future state of the user may be recorded in, for example, one or more user state 305 records. Block 600 may be performed remotely and/or locally relative to a device performing other components of interface 400. For example, at the time of obtaining encoded NL input 330 record comprising the text, "wash dishes", future states of the user of the user may be identified as "driving from work to home", "home" (wherein "home" may be a location associated with a location category 345 record of "home", and "church".

At block 700, interface 400 may invoke intent-to-state module 700 to match the inferred semantic meaning of block 500, which may comprise an intent, with one or more compatible present or future states of the user of block 600. Intent-to-state module 700 may match the inferred semantic meaning of block 500 with one or more compatible present or future states of the user as described in (described further in relation to FIG. 7). In this way, if a natural language input of block 405 lacks a statement of location and/or a time at which an intent is to be performed, block 700 may determine such location and/or time among present or future states of the user inferred by state of user module 600. For example, for encoded NL input 330 record comprising the text, "wash dishes", and the intent "wash" in relation to the objects "by me" and "dishes", intent-to-state matching module 700 may determine that a compatible future state of the user, "me", is when the user is at a location with a location category, "home", which may be anticipated and/or scheduled to occur later that evening. Block 700 may be performed remotely and/or locally relative to a device performing other components of interface 400.

At block 410, interface 400 may output a notice regarding an intent, object of intent, location, and time as may have been received and/or produced by interface 400. The output notice may comprise, for example, a reminder 325 record, a location 340 record, a location category 345 record, and a day-time 350 record. The output notice may be output in a user interface of a mobile computer device. The output notice may comprise or be accompanied by an explicit or implicit a request for confirmation of the subject matter of the output notice. For example, confirmation may be sought regarding whether the dishes are to be washed at home, with the option provided to the user that the user may select "church" as an alternative (in cases, for example, where the user is to wash dishes at church).

At block 415, interface 400 may receive a confirmation of and/or changes to one or more components of the output notice of block 410.

At block 420, interface 400 may update the output notice with the changes, if any, of block 415.

At block 499, interface 400 may conclude and/or return, such as to block 405 and/or to another process which may have called interface 400.

In this way, interface 400 may receive a natural language input from a user, wherein the natural language input lacks, for example, a statement of a location and/or time when an intent is to be performed. Interface 400 may infer a location and/or time when the intent may be performed and may output a reminder, wherein the reminder is to remind the user to perform the intent at the inferred location and/or time. In this way, natural language input may be used to interact with a computer device, such as, for example, to schedule reminders and to record events.

Figure 5:
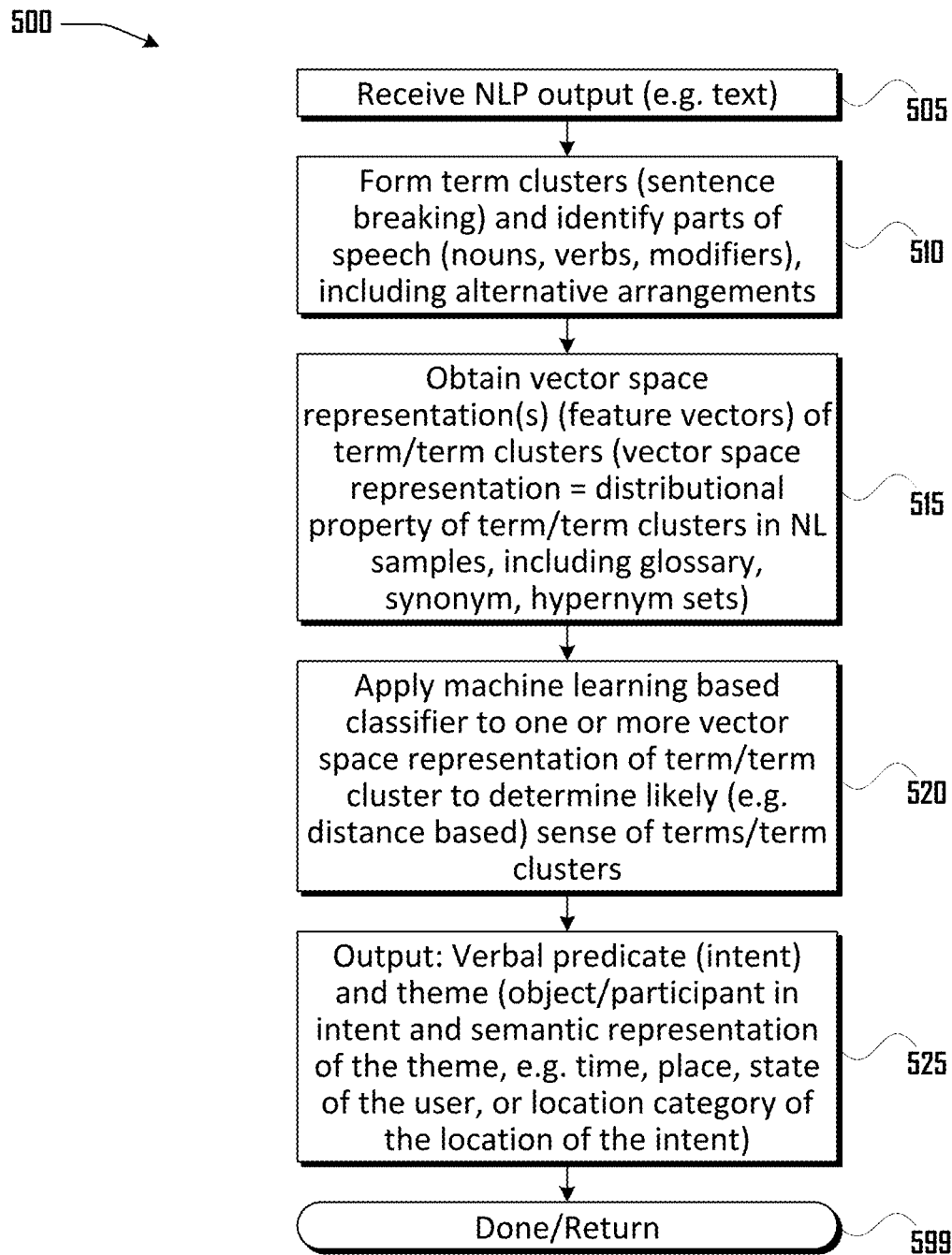
FIG. 5 is a flow diagram illustrating an example of a method performed by an intent extraction module, according to some embodiments.

FIG. 5 is a flow diagram illustrating an example of a method performed by an intent extraction module 500, according to some embodiments. All or part of intent extraction module 500 may be performed by, for example, intent processor 200 and/or a mobile device, such as mobile device-1 105A and/or mobile device-2 105B.

At block 505, intent extraction module 500 may receive the output of a natural language processing process, such as a speech-to-text process, text input to a computer device, or the like, such as an encoded NL input 330 record of block 405 of interface 400. The received output may comprise terms.

At block 510, intent extraction module 500 may form one or more clusters or sentences of or in the encoded NL input 330 record or the like of block 505. This may be performed according to, for example, a sentence breaking algorithm to determine the sentence boundaries in a chunk of text. Block 510 may further identify parts of speech, such as nouns, verbs, and modifiers in the natural language input. Block 510 may identify multiple alternative arrangements of the parts of speech for the natural language input.

At block 515, intent extraction module 500 may obtain one or more vector space representations of the term or term clusters of blocks 505 and/or 510. The vector space representation(s) may comprise, for example, a distributional property of a natural language sample ("NL sample") including the term(s)/term cluster(s). For example, the vector space may comprise a statistical measurement of terms/term clusters in the NL sample and how often such terms/term clusters appear next to or within another distance of other terms/term clusters in the NL sample. The vector space representations may be formed from and/or may comprise, for example, a glossary, a synonym set, and an antonym set relative to each term/term cluster. The vector space representations may comprise, for example, feature vector(s) for the term/term clusters, wherein the feature vector(s) encode a distance between the term/term cluster and other terms/term clusters (and glossary terms, synonyms, and antonyms).

The vector space may be organized as an ontology. The ontology may comprise term/term clusters and senses thereof, organized in, for example, a glossary for each term, as well as a synonym set for each term and an antonym set for each term. Senses may be stored as, for example, one or more sense 370 records. For example, with respect to the natural language input, "wash dishes", per a glossary, "dishes" may be associated with two senses, one of which may mean (approximately), "bowls and plates" while a second of which may mean (approximately), "to reveal" or "to talk about" (as in, "to dish about someone"). Synonyms and antonyms for these senses may also be part of the ontology.

At block 520, intent extraction module 500 may apply one or more machine learning-based classifier(s) to one or more vector space representations (such as to one or more feature vectors) of the term(s)/term cluster(s) of block 515 to determine a likely sense of the term(s)/term cluster(s). The likely sense may be determined, for example, based on a distance, such as a cosine similarity distance, between the vector space representations of the term(s)/term cluster(s) in the natural language input.

At block 525, intent extraction module 500 may output a verbal predicate and a theme. The verbal predicate may be discussed herein as "intent" and may be stored as one or more intent 310 records. The theme may comprise an object or participant in the intent and a semantic representation. The semantic representation may comprise, for example, a time, place, state of the user, and/or location category of the location of the intent. The object, participant in the intent, time, place, state of the user, and/or location category of the location of the intent may have been implicit in the natural language input; the object or participant in the intent may be stored as one or more object of intent 335 records.

At done block 599, intent extraction module 500 may conclude and/or return, such as to block 505 and/or to a process which may have called intent extraction module 500.

Figure 6:
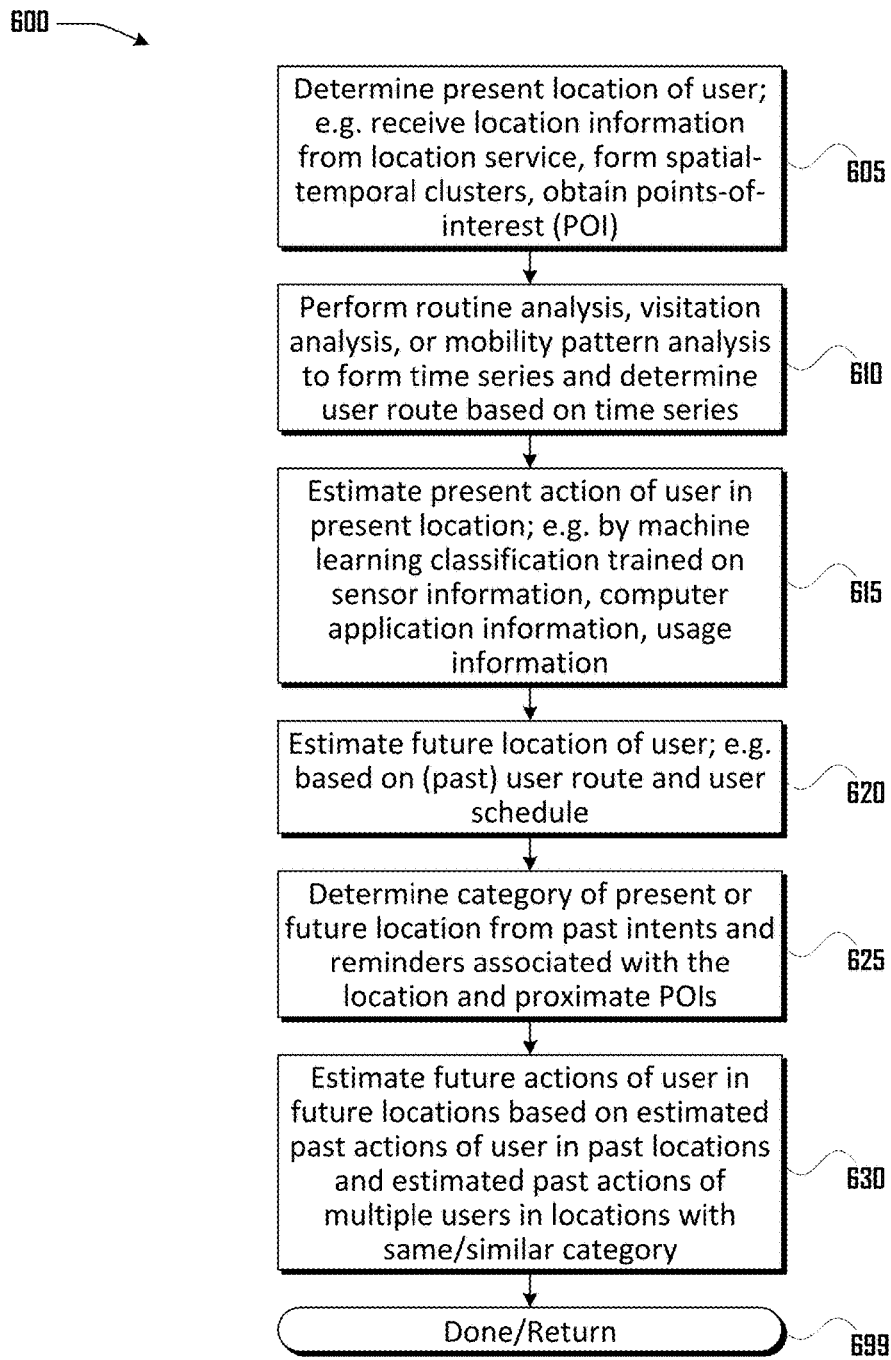
FIG. 6 is a flow diagram illustrating an example of a method performed by a state of user module, according to some embodiments.

FIG. 6 is a flow diagram illustrating an example of a method performed by a state of user module 600, according to some embodiments. All or part of state of user module 600 may be performed by, for example, intent processor 200 and/or a mobile device, such as mobile device-1 105A and/or mobile device-2 105B.

At block 605, state of user module 600 may determine a present location of the user. The present location of the user may be obtained from, for example, one or more location services, as may be provided by or as may use, for example, radio-1 110A through radio-4 110D. The locations may be obtained for a period of time, such as a minute, hour, day, week, month, or year. Locations may be stored as, for example, one or more location 340 records, in association with one or more day-time 350 records. At block 605, the locations may be clustered in space and time and points-of-interest in or proximate to the locations may be obtained, such as from a mapping service.

At block 610, state of user module 600 may perform routine analysis, visitation analysis, and/or mobility pattern analysis to form a time series of the spatial-temporal clusters of block 605. The time series may be stored as, for example, one or more route 315 records, in association with one or more day-time 350 records. For example, with respect to FIG. 1, mobile device-1 105A, as tracked by a location service relative to radio-1 110A through radio-4 110D, may produce location 340 records for mobile device-1 105A along route-A 115A and route-C 105C, which, together, may form a route repeatedly traversed by mobile device-1 105A; such route may be recorded as one or more route 315 records associated with mobile device-1 105A. Tracking of mobile device-2 105B may produce route-B 105B and route-C 105C; such route may be recorded as one or more route 315 records associated with mobile device-2 105B.

At block 615, state of user module 600 may estimate a present action of the user in the then-current present location. The present action may be produced by a machine learning classification algorithm trained on, for example sensor information and/or computer application information of a mobile computer device, as well as on, for example, usage information. Sensor information may comprise, for example a physiological information of the user, such as a movement, a rate-of-change of movement, a heart rate, a blood pressure, a color, a gaze, or the like, measured with respect to the user. Computer application information may comprise, for example, information regarding use of a computer application such as a productivity application (word processing, spreadsheet, etc.), a website application (such as a browser), a computer entertainment application, and the like. Usage information may comprise, for example, information regarding use of an object, where the object may be a computer, a vehicle, and a building. The present action may be stored as, for example, one or more action 390 records.

At block 620, state of user module 600 may estimate a future location of the user. This may be estimated based on, for example, a user route, such as one or more route 315 records associated with the user, a then-current day-time, a location of the user relative to a route 315 record, a schedule of the user, and the like (including a probability distribution function for the user over the locations of the route, over time). The future location of the user may be recorded as one or more location 340 records in association with day-time 350 records.

At block 625, state of user module 600 may determine a category of a present or future location of the user. The category of the location may be determined from intents and reminders associated with the location in past intents and reminders, such as past intent 310 and reminder 325 records associated with the location, whether by the user or a group of users. The past intent and reminders may comprise features and labels, wherein the labels comprise locations, such as location 340 records, and location categories, such as location category 345 records.

At block 630, state of user module 600 may estimate future action(s) of the user in the future locations according to or based on estimated past actions of the user in the location and estimated past actions of multiple users in the location or in locations with the same or a similar location category.

Present and future locations and present and future actions of the user may be recorded in, for example, one or more user state 305 records.

At done block 699, state of user module 600 may conclude, may return to a previous block, such as block 605, and/or may return to a process which may have called state of user module 600.

FIG. 7 is a flow diagram illustrating an example of a method performed an intent-to-state matching module 700, according to some embodiments. All or part of intent-to-state matching module 700 may be performed by, for example, intent processor 200 and/or a mobile device, such as mobile device-1 105A and/or mobile device-2 105B.

At block 705, intent-to-state matching module 700 may predict a state of the user the intent can be performed in. For example, a machine learning classifier may obtain the intent of the user, a location of the intent, and a category of the location of the intent (e.g. as output by intent extraction module 500), and the present or future locations of the user (such as from state of user module 600) and location categories of such present or future locations of the user.

At block 710, intent-to-state matching module 700 may obtain a present or future action of the user in the present or future state of the user, such as from state of user module 600.

At block 715, intent-to-state matching module 700 may match a present or future availability of the user, such as a present or future state of the user and a location category thereof, to a category of the location of the intent to identify compatible present or future locations of the user which have the same or a similar location category as the location of the intent. Block 715 may further select for a time which is not otherwise scheduled (such as per a reminder 325 record) or may select a time which is scheduled for performance of an intent, but wherein the scheduled intent has a lower priority than the intent to be scheduled. For example, an action which is interrupted by the user to perform another action may be reduced in priority.

At block 720, intent-to-state matching module 700 may output the present or future state of the user of block 715.

At done block 799, intent-to-state matching module 700 may conclude and/or return to another block, such as block 705, or may return to a process which may have called it.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

EXAMPLE 1

An apparatus for computing to infer a state of a user in which an intent of the user can be performed, comprising: a computer processor, a memory, and a natural language processing hardware accelerator with: an intent extraction module to determine the intent of the user from a natural language input; a state of the user module to determine a present or predicted state of the user; an intent-to-state matching module to match the intent with the present or predicted state of the user; and an interface to receive the natural language input or a binary conversion of the natural language input and to output a notice regarding the match between the present or predicted state of the user and the intent of the user.

EXAMPLE 2

The apparatus according to Example 1, wherein to determine the intent of the user from the natural language input, the intent extraction module is to apply a machine learning classifier to convert the natural language input into structured output arguments, wherein the structured output arguments comprise the intent of the user, at least one object of the intent, a location of the intent, and a day-time of the intent.

EXAMPLE 3

The apparatus according to Example 2, wherein the structured output arguments comprises a verbal predicate and a theme, wherein the verbal predicate is the intent and wherein the theme comprises an object, wherein the object comprises the at least one object of the intent and a semantic representation of the theme.

EXAMPLE 4

The apparatus according to Example 3, wherein to convert the natural language input into the semantic representation of the theme comprises to extract terms from the natural language input and determine a likely sense of each term with the machine learning classifier according to a vector space representation of the terms.

EXAMPLE 5

The apparatus according to Example 4, wherein the vector space representation of the terms comprises a distributional property of the terms in a sample of natural language.

EXAMPLE 6

The apparatus according to Example 5, wherein the vector space representation of the terms comprises a feature vector of the term in relation to a vector space, wherein the vector space comprises at least one of a glossary, a synonym set, or a hypernym set.

EXAMPLE 7

The apparatus according to Example 4, wherein the machine learning classifier comprises a supervised learning model and a learning algorithm to analyze the natural language input for one or both of classification or regression analysis.

EXAMPLE 8

The apparatus according to Example 7 wherein the supervised learning model comprises at least one of a support vector machine, a logistic regression, a decision tree, and ensemble model, a k-nearest neighbors model, or a neural network.

EXAMPLE 9

The apparatus according to Example 1, wherein the intent extraction module is further to infer at least one of a time, place, state of the user, or a location category of the location of the intent.

EXAMPLE 10

The apparatus according to Example 9, wherein to infer the at least one of a time, place, state of the user, or location category of the location of the intent, the intent extraction module is to apply a knowledge graph or trained topic model trained on past intents and reminders set by multiple users with respect to the past intents.

EXAMPLE 11

The apparatus according to Example 10, wherein the past intents and reminders comprise features and labels, wherein the labels comprise locations and location categories, and wherein the multiple users comprises the user.

EXAMPLE 12

The apparatus according to Example 1, wherein to determine the present or predicted state of the user, the state of the user module is to estimate a present or future location of the user, a category of the present or future location of the user, a present or future action of the user, or a present or future availability of the user.

EXAMPLE 13

The apparatus according to Example 12, wherein the present action of the user is determined by a machine learning classifier trained on at least one of a sensor information, a computer application information, or a usage information; wherein the sensor information comprises a recording of a physiological information of the user, the computer application information is from a computer application associated with the user; wherein the computer application information is from at least one of a computer productivity application, a computer website application, or a computer entertainment application, wherein the usage information comprises a data regarding a use of an object; and wherein the object comprises a computer, a vehicle, and a building and wherein the future action of the user is based on past actions of the user and/or other users in past locations.

EXAMPLE 14

The apparatus according to Example 12, wherein the present location of the user is determined based on a location information of the user from a location service, a cluster of the location information of the user, wherein the cluster is designated as a place of the user, and based on a point-of-interest proximate to or associated with the present location of the user.

EXAMPLE 15

The apparatus according to Example 14, wherein the state of the user module is further to form a route of the user based on a time series of the present location of the user and on at least one of routine analysis, visitation analysis, or mobility pattern analysis of the time series.

EXAMPLE 16

The apparatus according to Example 15, wherein the state of the user module is further to predict the future location of the user based the route of the user and a schedule of the user.

EXAMPLE 17

The apparatus according to Example 12, wherein the category of the present or future location of the user is determined according to past intents and reminders set with respect to the present or future location of the user, wherein the past intents and reminders comprise features and labels, wherein the labels comprise locations and location categories.

EXAMPLE 18

The apparatus according to any one or more of Example 12 to Example 17, wherein the state of the user module is to estimate the present or future availability of the user according to at least one of a time not otherwise scheduled for performance of an intent or a time scheduled for performance of an intent when the user can be interrupted.

EXAMPLE 19

The apparatus according to Example 1, wherein to match the intent with the present or predicted state of the user, the intent-to-state matching module is to predict a state of the user the intent can be performed in.

EXAMPLE 20

The apparatus according to Example 19, wherein to predict the state of the user the intent can be performed in comprises to determine a present or future location of the user according to a route of the user and a location category of such present or future location of the user, obtain a location of the intent and a category of the location of the intent, and match the location category of such present or future location of the user to the category of the location of the intent.

EXAMPLE 21

The apparatus according to any one or more of Example 1 to Example 20, wherein to receive the natural language input, the user interface is to receive at least one of phonemes, a text, or a gesture.

EXAMPLE 22

The apparatus according to any one or more of Example 1 to Example 20, wherein the interface is one of a user interface or a network interface.

EXAMPLE 23

The apparatus according to any one or more of Example 1 to Example 20, wherein to output the notice regarding the matched present state of the user or the predicted state of the user, the user interface is to output at least one of a reminder to engage in the intent, a confirmation of the intent of the user, or a confirmation of the match between the present or predicted state of the user and the intent of the user.

EXAMPLE 24

A computer implemented method, wherein the method comprises, with a natural language processing hardware accelerator: receiving a natural language input or a binary conversion of the natural language input; determining an intent of a user from a natural language input; determining a present or predicted state of the user; matching the intent with the present or predicted state of the user; and outputting a notice regarding the match between the present or predicted state of the user and the intent of the user.

EXAMPLE 25

The method according to Example 24, wherein determining the intent of the user from the natural language input comprises converting the natural language input into structured output arguments using a machine learning classifier, wherein the structured output arguments comprise the intent of the user, at least one object of the intent, a location of the intent, and a day-time of the intent.

EXAMPLE 26

The method according to Example 25, wherein the structured output arguments comprises a verbal predicate and a theme, wherein the verbal predicate is the intent and wherein the theme comprises an object, wherein the object comprises the at least one object of the intent and a semantic representation of the theme.

EXAMPLE 27

The method according to Example 26, wherein converting the natural language input into the semantic representation of the theme comprises extracting terms from the natural language input and determining a likely sense of each term with the machine learning classifier according to a vector space representation of the terms, wherein the vector space representation of the terms comprises a distributional property of the terms in a sample of natural language.

EXAMPLE 28

The method according to Example 27, wherein the vector space representation of the terms comprises a feature vector of the term in relation to a vector space, wherein the vector space comprises at least one of a glossary, a synonym set, or a hypernym set.

EXAMPLE 29

The method according to Example 27, wherein the machine-learning classifier comprises a supervised learning model and a learning algorithm to analyze the natural language input for one or both of classification or regression analysis.

EXAMPLE 30

The method according to Example 29, wherein the supervised learning model comprises at least one of a support vector machine, a logistic regression, a decision tree, and ensemble model, a k-nearest neighbors model, or a neural network.

EXAMPLE 31

The method according to Example 24, wherein further comprising inferring at least one of a time, place, state of the user, or a location category of the location of the intent.

EXAMPLE 32

The method according to Example 31, wherein inferring the at least one of a time, place, state of the user, or location category of the location of the intent comprises applying a knowledge graph or trained topic model trained on past intents and reminders set by multiple users with respect to the past intents.

EXAMPLE 33

The method according to Example 32, wherein the past intents and reminders comprise features and labels, wherein the labels comprise locations and location categories, and wherein the multiple users comprises the user.

EXAMPLE 34

The method according to Example 24, wherein determining the present or predicted state of the user comprises estimating a present or future location of the user, a category of the present or future location of the user, a present or future action of the user, or a present or future availability of the user.

EXAMPLE 35

The method according to Example 34, further comprising determining the present action of the user according to a machine learning classifier trained on at least one of a sensor information, a computer application information, or a usage information; wherein the sensor information comprises a recording of a physiological information of the user, the computer application information is from a computer application associated with the user; wherein the computer application information is from at least one of a computer productivity application, a computer website application, or a computer entertainment application, wherein the usage information comprises a data regarding a use of an object; and wherein the object comprises a computer, a vehicle, and a building and wherein the future action of the user is based on past actions of the user and/or other users in past locations.

EXAMPLE 36

The method according to Example 34, further comprising determining the present location of the user from a location information of the user from a location service, clustering the location information of the user, wherein the cluster is designated as a place of the user, and obtaining a point-of-interest proximate to or associated with the present location of the user.

EXAMPLE 37

The method according to Example 36, further comprising forming a route of the user based on a time series of the present location of the user and performing at least one of routine analysis, visitation analysis, or mobility pattern analysis of the time series of the present location of the user.

EXAMPLE 38

The method according to Example 37, further comprising predicting the future location of the user based the route of the user and a schedule of the user.

EXAMPLE 39

The method according to Example 34, further comprising determining the category of the present or future location of the user according to past intents and reminders set with respect to the present or future location of the user, wherein the past intents and reminders comprise features and labels, wherein the labels comprise locations and location categories.

EXAMPLE 40

The method according to Example 34, further comprising estimating the present or future availability of the user according to at least one of a time not otherwise scheduled for performance of an intent or a time scheduled for performance of an intent when the user can be interrupted.

EXAMPLE 41

The method according to Example 24, wherein matching the intent with the present or predicted state of the user further comprises predicting a state of the user the intent can be performed in.

EXAMPLE 42

The method according to Example 41, wherein predicting the state of the user the intent can be performed in comprises determining a present or future location of the user according to a route of the user and a location category of such present or future location of the user, obtaining a location of the intent and a category of the location of the intent, and matching the location category of such present or future location of the user to the category of the location of the intent.

EXAMPLE 43

The method according to any one or more of Example 24 to Example 42, wherein receiving the natural language input comprises receiving at least one of phonemes, a text, or a gesture.

EXAMPLE 44

The method according to any one or more of Example 24 to Example 42, wherein receiving the natural language input or a binary conversion of the natural language input comprises receiving the natural language input or a binary conversion of the natural language input from a remote mobile computer device and outputting the notice regarding the match between the present or predicted state of the user and the intent of the user comprises outputting the notice regarding the match between the present or predicted state of the user and the intent of the user to the remote mobile computer device.

EXAMPLE 45

The method according to any one or more of Example 24 to Example 44, wherein outputting the notice regarding the matched present state of the user or the predicted state of the user further comprises outputting at least one of a reminder to engage in the intent, a confirmation of the intent of the user, or a confirmation of the match between the present or predicted state of the user and the intent of the user.

EXAMPLE 46

An apparatus for computing, comprising: means to receive a natural language input or a binary conversion of the natural language input; means to determine an intent of a user from a natural language input; means to determine a present or predicted state of the user; means to match the intent with the present or predicted state of the user; and means to output a notice regarding the match between the present or predicted state of the user and the intent of the user.

EXAMPLE 47

The apparatus according to Example 46, wherein means to determine the intent of the user from the natural language input comprises means to apply a machine learning classifier to convert the natural language input into structured output arguments, wherein the structured output arguments comprise the intent of the user, at least one object of the intent, a location of the intent, and a day-time of the intent.

EXAMPLE 48

The apparatus according to Example 47, wherein the structured output arguments comprises a verbal predicate and a theme, wherein the verbal predicate is the intent and wherein the theme comprises an object, wherein the object comprises the at least one object of the intent and a semantic representation of the theme.

EXAMPLE 49

The apparatus according to Example 48, wherein means to convert the natural language input into the semantic representation of the theme comprises means to extract terms from the natural language input and determine a likely sense of each term with the machine learning classifier according to a vector space representation of the terms, wherein the vector space representation of the terms comprises a distributional property of the terms in a sample of natural language.

EXAMPLE 50

The apparatus according to Example 49, wherein the vector space representation of the terms comprises a feature vector of the term in relation to a vector space, wherein the vector space comprises at least one of a glossary, a synonym set, or a hypernym set.

EXAMPLE 51

The apparatus according to Example 49, wherein the machine-learning classifier comprises a supervised learning model and a learning algorithm to analyze the natural language input for one or both of classification or regression analysis.

EXAMPLE 52

The apparatus according to Example 51, wherein the supervised learning model comprises at least one of a support vector machine, a logistic regression, a decision tree, and ensemble model, a k-nearest neighbors model, or a neural network.

EXAMPLE 53

The apparatus according to Example 46, further comprising means to infer at least one of a time, place, state of the user, or a location category of the location of the intent.

EXAMPLE 54

The apparatus according to Example 53, wherein means to infer the at least one of a time, place, state of the user, or location category of the location of the intent, comprises means to apply a knowledge graph or trained topic model trained on past intents and reminders set by multiple users with respect to the past intents.

EXAMPLE 55

The apparatus according to Example 54, wherein the past intents and reminders comprise features and labels, wherein the labels comprise locations and location categories, and wherein the multiple users comprises the user.

EXAMPLE 56

The apparatus according to Example 46, wherein means to determine the present or predicted state of the user, comprises mean to estimate a present or future location of the user, a category of the present or future location of the user, a present or future action of the user, or a present or future availability of the user.

EXAMPLE 57

The apparatus according to Example 56, wherein the means to determine the present action of the user comprises a machine learning classifier trained on at least one of a sensor information, a computer application information, or a usage information; wherein the sensor information comprises a recording of a physiological information of the user, the computer application information is from a computer application associated with the user; wherein the computer application information is from at least one of a computer productivity application, a computer website application, or a computer entertainment application, wherein the usage information comprises a data regarding a use of an object; and wherein the object comprises a computer, a vehicle, and a building and wherein the future action of the user is based on past actions of the user and/or other users in past locations.

EXAMPLE 58

The apparatus according to Example 56, wherein the means to determine the present location of the user comprises means to receive a location information of the user from a location service, means to cluster the location information of the user into a cluster, means to designate the cluster as a place associated with the user, and means to obtain a point-of-interest proximate to or associated with the present location of the user.

EXAMPLE 59

The apparatus according to Example 58, further comprising means to form a route of the user based on a time series of the present location of the user and on at least one of means to perform routine analysis, visitation analysis, or mobility pattern analysis on the time series of the present location of the user.

EXAMPLE 60

The apparatus according to Example 59, further comprising means to predict the future location of the user based the route of the user and a schedule of the user.

EXAMPLE 61

The apparatus according to Example 56, means to determine the category of the present or future location of the user according to past intents and reminders set with respect to the present or future location of the user, wherein the past intents and reminders comprise features and labels, wherein the labels comprise locations and location categories.

EXAMPLE 62

The apparatus according to any one or more of Example 56 to Example 61, further comprising means to estimate the present or future availability of the user according to at least one of a time not otherwise scheduled for performance of an intent or a time scheduled for performance of an intent when the user can be interrupted.

EXAMPLE 63

The apparatus according to any one or more of Example 46 to Example 62, wherein means to match the intent with the present or predicted state of the user comprises means to predict a state of the user the intent can be performed in.

EXAMPLE 64

The apparatus according to Example 63, wherein means to predict the state of the user the intent can be performed in comprises means to determine a present or future location of the user according to a route of the user and a location category of such present or future location of the user, means to obtain a location of the intent and a category of the location of the intent, and means to match the location category of such present or future location of the user to the category of the location of the intent.

EXAMPLE 65

The apparatus according to any one or more of Example 46 to Example 64, wherein means to receive the natural language input comprises means to receive at least one of phonemes, a text, or a gesture.

EXAMPLE 66

The apparatus according to any one or more of Example 46 to Example 64, further comprising means for a user interface to receive the natural language input or a binary conversion of the natural language input and means to output the notice regarding the match between the present or predicted state of the user and the intent of the user to the user interface.

EXAMPLE 67

The apparatus according to any one or more of Example 46 to Example 64, wherein means to output the notice regarding the matched present state of the user or the predicted the state of the user comprises means to output at least one of a reminder to engage in the intent, a confirmation of the intent of the user, or a confirmation of the match between the present or predicted state of the user and the intent of the user.

EXAMPLE 68

One or more computer-readable media comprising instructions that cause a computer device, in response to execution of the instructions by a processor of the computer device, to: receive a natural language input or a binary conversion of the natural language input; determine an intent of a user from a natural language input; determine a present or predicted state of the user; match the intent with the present or predicted state of the user; and output a notice regarding the match between the present or predicted state of the user and the intent of the user.

EXAMPLE 69

The computer-readable media according to Example 68, wherein determine the intent of the user from the natural language input comprises apply a machine learning classifier to convert the natural language input into structured output arguments, wherein the structured output arguments comprise the intent of the user, at least one object of the intent, a location of the intent, and a day-time of the intent.

EXAMPLE 70

The computer-readable media according to Example 69, wherein the structured output arguments comprises a verbal predicate and a theme, wherein the verbal predicate is the intent and wherein the theme comprises an object, wherein the object comprises the at least one object of the intent and a semantic representation of the theme.

EXAMPLE 71

The computer-readable media according to Example 70, wherein convert the natural language input into the semantic representation of the theme comprises extract terms from the natural language input and determine a likely sense of each term with the machine learning classifier according to a vector space representation of the terms.

EXAMPLE 72

The computer-readable media according to Example 71, wherein the vector space representation of the terms comprises a feature vector of the term in relation to a vector space, wherein the vector space comprises at least one of a glossary, a synonym set, or a hypernym set.

EXAMPLE 73

The computer-readable media according to Example 71, wherein the machine-learning classifier comprises a supervised learning model and a learning algorithm to analyze the natural language input for one or both of classification or regression analysis.

EXAMPLE 74

The computer-readable media according to Example 73, wherein the supervised learning model comprises at least one of a support vector machine, a logistic regression, a decision tree, and ensemble model, a k-nearest neighbors model, or a neural network.

EXAMPLE 75

The computer-readable media according to Example 68, wherein the instructions are further to cause to the processor to infer at least one of a time, place, state of the user, or a location category of the location of the intent.

EXAMPLE 76

The computer-readable media according to Example 75, wherein to infer the at least one of a time, place, state of the user, or location category of the location of the intent further comprises to apply a knowledge graph or trained topic model trained on past intents and reminders set by multiple users with respect to the past intents.

EXAMPLE 77

The computer-readable media according to Example 76, wherein the past intents and reminders comprise features and labels, wherein the labels comprise locations and location categories, and wherein the multiple users comprises the user.

EXAMPLE 78

The computer-readable media according to Example 68, wherein determine the present or predicted state of the user further comprises estimate a present or future location of the user, a category of the present or future location of the user, a present or future action of the user, or a present or future availability of the user.

EXAMPLE 79

The computer-readable media according to Example 78, wherein determine the present action of the user comprises determine the present action of the user with a machine learning classifier module trained on at least one of a sensor information, a computer application information, or a usage information; wherein the sensor information comprises a recording of a physiological information of the user, the computer application information is from a computer application associated with the user; wherein the computer application information is from at least one of a computer productivity application, a computer website application, or a computer entertainment application, wherein the usage information comprises a data regarding a use of an object; and wherein the object comprises a computer, a vehicle, and a building and wherein the future action of the user is based on past actions of the user and/or other users in past locations.

EXAMPLE 80

The computer-readable media according to Example 78, wherein determine the present location of the user comprises determine the present location of the user based on a location information of the user from a location service, cluster the location information of the user into a cluster, designate the cluster as a place of the user, and obtain a point-of-interest proximate to or associated with the present location of the user.

EXAMPLE 81

The computer-readable media according to Example 80, further comprising form a route of the user based on a time series of the present location of the user and on at least one of routine analysis, visitation analysis, or mobility pattern analysis of the time series of the present location of the user.

EXAMPLE 82

The computer-readable media according to Example 81, further comprising predict the future location of the user based the route of the user and a schedule of the user.

EXAMPLE 83

The computer-readable media according to Example 78, further comprising determine the category of the present or future location of the user according to past intents and reminders set with respect to the present or future location of the user, wherein the past intents and reminders comprise features and labels, wherein the labels comprise locations and location categories.

EXAMPLE 84

The computer-readable media according to any one or more of Example 78 to Example 83, further comprising estimate the present or future availability of the user according to at least one of a time not otherwise scheduled for performance of an intent or a time scheduled for performance of an intent when the user can be interrupted.

EXAMPLE 85

The computer-readable media according to Example 68, wherein match the intent with the present or predicted state of the user comprises predict a state of the user the intent can be performed in.

EXAMPLE 86

The computer-readable media according to Example 85, wherein predict the state of the user the intent can be performed in comprises determine a present or future location of the user according to a route of the user and a location category of such present or future location of the user, obtain a location of the intent and a category of the location of the intent, and match the location category of such present or future location of the user to the category of the location of the intent.

EXAMPLE 87

The computer-readable media according to any one or more of Example 68 to Example 86, wherein receive the natural language input comprises receive at least one of phonemes, a text, or a gesture.

EXAMPLE 88

The computer-readable media according to any one or more of Example 68 to Example 86, further comprising receive the natural language input or a binary conversion of the natural language input comprises receive the natural language input or a binary conversion of the natural language input from a remote mobile computer device and output the notice regarding the match between the present or predicted state of the user and the intent of the user comprises output the notice regarding the match between the present or predicted state of the user and the intent of the user to the remote mobile computer device.

EXAMPLE 89

The computer-readable media according to Example 68, wherein output the notice regarding the matched present state of the user or the predicted the state of the user comprises output at least one of a reminder to engage in the intent, a confirmation of the intent of the user, or a confirmation of the match between the present or predicted state of the user and the intent of the user.

EXAMPLE 90

A system for computing, comprising: a processor, a memory, and a natural language processing hardware accelerator to: receive a natural language input or a binary conversion of the natural language input; determine an intent of a user from a natural language input; determine a present or predicted state of the user; match the intent with the present or predicted state of the user; and output a notice regarding the match between the present or predicted state of the user and the intent of the user.

EXAMPLE 91

The system according to Example 90, wherein determine the intent of the user from the natural language input comprises apply a machine learning classifier to convert the natural language input into structured output arguments, wherein the structured output arguments comprise the intent of the user, at least one object of the intent, a location of the intent, and a day-time of the intent.

EXAMPLE 92

The system according to Example 91, wherein the structured output arguments comprises a verbal predicate and a theme, wherein the verbal predicate is the intent and wherein the theme comprises an object, wherein the object comprises the at least one object of the intent and a semantic representation of the theme.

EXAMPLE 93

The system according to Example 92, wherein convert the natural language input into the semantic representation of the theme comprises extract terms from the natural language input and determine a likely sense of each term with the machine learning classifier according to a vector space representation of the terms, wherein the vector space representation of the terms comprises a distributional property of the terms in a sample of natural language.

EXAMPLE 94

The system according to Example 93, wherein the vector space representation of the terms comprises a feature vector of the term in relation to a vector space, wherein the vector space comprises at least one of a glossary, a synonym set, or a hypernym set.

EXAMPLE 95

The system according to Example 93, wherein the machine-learning classifier comprises a supervised learning model and a learning algorithm to analyze the natural language input for one or both of classification or regression analysis.

EXAMPLE 96

The system according to Example 95, wherein the supervised learning model comprises at least one of a support vector machine, a logistic regression, a decision tree, and ensemble model, a k-nearest neighbors model, or a neural network.

EXAMPLE 97

The system according to Example 90, wherein the system is further to infer at least one of a time, place, state of the user, or a location category of the location of the intent.

EXAMPLE 98

The system according to Example 97, wherein infer the at least one of a time, place, state of the user, or location category of the location of the intent, comprises apply a knowledge graph or trained topic model trained on past intents and reminders set by multiple users with respect to the past intents.

EXAMPLE 99

The system according to Example 98, wherein the past intents and reminders comprise features and labels, wherein the labels comprise locations and location categories, and wherein the multiple users comprises the user.

EXAMPLE 100

The system according to Example 90, wherein determine the present or predicted state of the user, comprises estimate a present or future location of the user, a category of the present or future location of the user, a present or future action of the user, or a present or future availability of the user.

EXAMPLE 101

The system according to Example 100, wherein determine the present action of the user comprises determine with a machine learning classifier trained on at least one of a sensor information, a computer application information, or a usage information; wherein the sensor information comprises a recording of a physiological information of the user, the computer application information is from a computer application associated with the user; wherein the computer application information is from at least one of a computer productivity application, a computer website application, or a computer entertainment application, wherein the usage information comprises a data regarding a use of an object; and wherein the object comprises a computer, a vehicle, and a building and wherein the future action of the user is based on past actions of the user and/or other users in past locations.

EXAMPLE 102

The system according to Example 100, wherein determine the present location of the user comprises receive a location information of the user from a location service, cluster the location information of the user into a cluster, designate the the cluster as a place associated with the user, and obtain a point-of-interest proximate to or associated with the present location of the user.

EXAMPLE 103

The system according to Example 102, wherein the system is further to form a route of the user based on a time series of the present location of the user.

EXAMPLE 104

The system according to Example 103, wherein the system is further to predict the future location of the user based the route of the user and a schedule of the user.

EXAMPLE 105

The system according to Example 100, wherein the system is to determine the category of the present or future location of the user according to past intents and reminders set with respect to the present or future location of the user, wherein the past intents and reminders comprise features and labels, wherein the labels comprise locations and location categories.

EXAMPLE 106

The system according to any one or more of Example 100 to Example 105, wherein the system is further to estimate the present or future availability of the user according to at least one of a time not otherwise scheduled for performance of an intent or a time scheduled for performance of an intent when the user can be interrupted.

EXAMPLE 107

The system according to any one or more of Example 90 to Example 106, wherein match the intent with the present or predicted state of the user comprises predict a state of the user the intent can be performed in.

EXAMPLE 108

The system according to Example 107, wherein predict the state of the user the intent can be performed in comprises determine a present or future location of the user according to a route of the user and a location category of such present or future location of the user, obtain a location of the intent and a category of the location of the intent, and match the location category of such present or future location of the user to the category of the location of the intent.

EXAMPLE 109

The system according to any one or more of Example 90 to Example 108, wherein receive the natural language input comprises receive at least one of phonemes, a text, or a gesture.

EXAMPLE 110

The system according to any one or more of Example 90 to Example 108, wherein the system is further to receive the natural language input or a binary conversion of the natural language input at a network interface from a remote mobile computer device and output the notice regarding the match between the present or predicted state of the user and the intent of the user via the network interface to the remote mobile computer device.

EXAMPLE 111

The apparatus according to any one or more of Example 90 to Example 108, wherein output the notice regarding the matched present state of the user or the predicted the state of the user comprises output at least one of a reminder to engage in the intent, a confirmation of the intent of the user, or a confirmation of the match between the present or predicted state of the user and the intent of the user.

The invention claimed is:

1. An apparatus for computing to infer a state of a user in which an intent of the user can be performed, comprising:
    a computer processor, a memory, and a natural language processing hardware accelerator with:
    an intent extraction module to determine the intent of the user from a natural language input;
    a state of a user module to determine a present or predicted state of the user, wherein the state of the user module is to apply a machine learning classifier module comprising a supervised learning model trained on one or both of a sensor information and a computer application information on the apparatus;
    an intent-to-state matching module to match the intent with the present or predicted state of the user; and
    an interface to receive the natural language input or a binary conversion of the natural language input and to output a notice regarding the match between the present or predicted state of the user and the intent of the user; wherein
    to match the intent with the present or predicted state of the user, the intent-to-state matching module is to predict a state of the user the intent can be performed in, wherein to predict the state of the user the intent can be performed in comprises to determine a present or future location of the user according to a route of the user and a location category of such present or future location of the user, obtain a location of the intent and a category of the location of the intent, and match the location category of such present or future location of the user to the category of the location of the intent.

2. The apparatus according to claim 1, wherein to determine the intent of the user from the natural language input, the intent extraction module is to apply a machine learning classifier to convert the natural language input into structured output arguments, wherein the structured output arguments comprise a verbal predicate comprising the intent of the user, a theme, and a semantic representation of the theme, wherein the theme and/or semantic representation comprises at least one object of the intent, a location of the intent, and a day-time of the intent.

3. The apparatus according to claim 2, wherein to convert the natural language input into the structured output arguments comprises to extract terms from the natural language input and determine a likely sense of each term with the machine learning classifier according to a vector space representation of the terms, wherein the vector space representation of the terms comprises a distributional property of the terms in a sample of natural language.

4. The apparatus according to claim 1, wherein the intent extraction module is further to infer at least one of a time, place, state of the user, or a location category of the location of the intent, based on application of a knowledge graph or trained topic model trained on past intents and reminders set by multiple users with respect to the past intents.

5. The apparatus according to claim 1, wherein to determine the present or predicted state of the user, the state of the user module is to estimate a present or future location of the user, a category of the present or future location of the user, a present or future action of the user, or a present or future availability of the user, wherein the state of the user module is further to form a route of the user based on a time series of the present location of the user and on at least one of routine analysis, visitation analysis, or mobility pattern analysis of the time series, and wherein the state of the user module is further to predict the future location of the user based the route of the user and a schedule of the user.

6. The apparatus according to claim 1, wherein the machine learning classifier module further comprises a learning algorithm to analyze the natural language input according to one or both of classification or regression analysis.

7. The apparatus according to claim 1, wherein to output the notice regarding the matched present state of the user or the predicted the state of the user, the interface is to output at least one of a reminder to engage in the intent, a confirmation of the intent of the user, or a confirmation of the match between the present or predicted state of the user and the intent of the user.

8. A computer implemented method, wherein the method comprises, with a natural language processing hardware accelerator:
receiving a natural language input or a binary conversion of the natural language input;
determining an intent of a user from a natural language input;
determining a present or predicted state of the user with a machine learning classifier comprising a supervised learning model trained on one or both of a sensor information and a computer application information;
matching the intent with the present or predicted state of the user; and
outputting a notice regarding the match between the present or predicted state of the user and the intent of the user; wherein matching the intent with the present or predicted state of the user comprises predicting a state of the user the intent can be performed in and wherein predicting a state of the user the intent can be performed in comprises determining a present or future location of the user according to a route of the user and a location category of such present or future location of the user, obtaining a location of the intent and a category of the location of the intent, and matching the location category of such present or future location of the user to the category of the location of the intent.

9. The method according to claim 8, wherein determining the intent of the user from the natural language input comprises converting the natural language input into structured output arguments using a machine learning classifier, wherein the structured output arguments comprise a verbal predicate comprising the intent of the user, a theme, and a semantic representation of the theme, wherein the theme and/or semantic representation comprises at least one object of the intent, a location of the intent, and a day-time of the intent.

10. The method according to claim 9, wherein converting the natural language input into the structured output arguments comprises extracting terms from the natural language input and determining a likely sense of each term with the machine learning classifier according to a vector space representation of the terms, wherein the vector space representation of the terms comprises a distributional property of the terms in a sample of natural language.

11. The method according to claim 8, further comprising inferring at least one of a time, place, state of the user, or a location category of the location of the intent based on applying a knowledge graph or trained topic model trained on past intents and reminders set by multiple users with respect to the past intents.

12. The method according to claim 8, wherein determining the present or predicted state of the user comprises estimating a present or future location of the user, a category of the present or future location of the user, a present or future action of the user, or a present or future availability of the user; further comprising determining the present location of the user from a location information of the user from a location service; further comprising predicting the future location of the user based a route of the user and a schedule of the user; and further comprising determining the category of the present or future location of the user according to past intents and reminders set with respect to the present or future location of the user.

13. The method according to claim 8, wherein the machine learning classifier comprises a learning algorithm analyzing the natural language input through one or both of classification or regression analysis.

14. An apparatus for computing, comprising:
means to receive a natural language input or a binary conversion of the natural language input;
means to determine an intent of a user from a natural language input;
means to determine a present or predicted state of the user;
means to match the intent with the present or predicted state of the user;
means to output a notice regarding the match between the present or predicted state of the user and the intent of the user; wherein means to determine a present or predicted state of the user comprises means to apply a machine learning classifier comprising a supervised learning model trained on one or both of a sensor information and a computer application information on the apparatus; and means to match the intent with the present or predicted state of the user comprises means to predict a state of the user the intent can be performed in, wherein means to predict the state of the user the intent can be performed in comprises means to determine a present or future location of the user according to a route of the user and a location category of such present or future location of the user, means to obtain a location of the intent and a category of the location of the intent, and means to match the location category of such present or future location of the user to the category of the location of the intent.

15. The apparatus according to claim 14, wherein means to determine the intent of the user from the natural language input comprises means to apply a machine learning classifier to convert the natural language input into structured output arguments, wherein the structured output arguments comprise a verbal predicate comprising the intent of the user, a theme, and a semantic representation of the theme, wherein the theme and/or semantic representation of the theme comprises at least one object of the intent, a location of the intent, and a day-time of the intent, wherein the machine-learning classifier comprises a supervised learning model and a learning algorithm to analyze the natural language input for one or both of classification or regression analysis, and wherein the supervised learning model comprises at least one of a support vector machine, a logistic regression, a decision tree, an ensemble model, a k-nearest neighbors model, or a neural network.

16. The apparatus according to claim 15, wherein means to convert the natural language input into the structured output arguments comprises means to extract terms from the natural language input and determine a likely sense of each term with the machine learning classifier according to a vector space representation of the terms, wherein the vector space representation of the terms comprises a distributional property of the terms in a sample of natural language.

17. The apparatus according to claim 14, further comprising means to infer at least one of a time, place, state of the user, or a location category of the location of the intent using means to apply a knowledge graph or trained topic model trained on past intents and reminders set by multiple users with respect to the past intents.

18. The apparatus according to claim 14, wherein means to determine the present or predicted state of the user comprises mean to estimate a present or future location of the user, a category of the present or future location of the user, a present or future action of the user, or a present or future availability of the user, wherein the means to determine the present location of the user comprises means to receive a location information of the user from a location service, means to cluster the location information of the user into a cluster; further comprising means to form a route of the user based on a time series of the present location of the user and means to predict the future location of the user based the route of the user and a schedule of the user.

19. The apparatus according to claim 14, wherein the machine learning classifier comprises means to analyze the natural language input through one or both of classification or regression analysis.

20. The apparatus according to claim 14, wherein means to output the notice regarding the matched present state of the user or the predicted the state of the user comprises means to output at least one of a reminder to engage in the intent, a confirmation of the intent of the user, or a confirmation of the match between the present or predicted state of the user and the intent of the user.

21. One or more non-transitory computer-readable media comprising instructions that cause a computer device, in response to execution of the instructions by a processor of the computer device, to:

receive a natural language input or a binary conversion of the natural language input;

determine an intent of a user from a natural language input;

determine a present or predicted state of the user with a machine learning classifier comprising a supervised learning model trained on one or both of a sensor information and a computer application information of the computer device;

match the intent with the present or predicted state of the user; and output a notice regarding the match between the present or predicted state of the user and the intent of the user; wherein match the intent with the present or predicted state of the user comprises predict a state of the user the intent can be performed in and wherein predict a state of the user the intent can be performed in comprises determine a present or future location of the user according to a route of the user and a location category of such present or future location of the user, obtain a location of the intent and a category of the location of the intent, and match the location category of such present or future location of the user to the category of the location of the intent.

22. The non-transitory computer-readable media according to claim 21, wherein determine the intent of the user from the natural language input comprises apply a machine learning classifier to convert the natural language input into structured output arguments, wherein the structured output arguments comprise a verbal predicate comprising the intent of the user, a theme, and a semantic representation of the theme, wherein the theme and/or semantic representation comprises at least one object of the intent, a location of the intent, and a day-time of the intent.

23. The non-transitory computer-readable media according to claim 22, wherein convert the natural language input into the structured output arguments comprises extract terms from the natural language input and determine a likely sense of each term with the machine learning classifier according to a vector space representation of the terms, wherein the vector space representation of the terms comprises a distributional property of the terms in a sample of natural language.

24. The non-transitory computer-readable media according to claim 21, wherein the instructions are further to cause to the processor to infer at least one of a time, place, state of the user, or a location category of the location of the intent.

25. The non-transitory computer-readable media according to claim 21, wherein the machine learning classifier further comprises a learning algorithm to analyze the natural language input for one or both of classification or regression analysis.

* * * * *

UNITED STATES PATENT AND TRADEMARK OFFICE
CERTIFICATE OF CORRECTION

PATENT NO. : 10,394,954 B2
APPLICATION NO. : 15/443043
DATED : August 27, 2019
INVENTOR(S) : Oded Vainas et al.

It is certified that error appears in the above-identified patent and that said Letters Patent is hereby corrected as shown below:

In the Claims

Column 29
Line 42, "based the route…" should read – "based on the route…"
Line 50, "the predicted the state…" should read – "the predicted state…"

Column 30
Line 47, "…based a route…" should read – "…based on a route…"

Column 31
Line 61, "based the route…" should read – "based on the route…"

Column 32
Line 3, "…the predicted the state…" should read – "…the predicted state…"
Lines 56-57, "…to cause to the processor…" should read – "…to cause the processor…"

Signed and Sealed this
Twelfth Day of November, 2019

Andrei Iancu
*Director of the United States Patent and Trademark Office*